(12) United States Patent
Aiger et al.

(10) Patent No.: US 9,665,989 B1
(45) Date of Patent: May 30, 2017

(54) FEATURE AGNOSTIC GEOMETRIC ALIGNMENT

(71) Applicant: Google Inc., Mountain View, CA (US)

(72) Inventors: Dror Aiger, Ramat Gan (IL); Jonathan Weill, Ganey Tikva, IL (US)

(73) Assignee: Google Inc., Mountain View, CA (US)

( * ) Notice: Subject to any disclaimer, the term of this patent is extended or adjusted under 35 U.S.C. 154(b) by 296 days.

(21) Appl. No.: 14/624,494

(22) Filed: Feb. 17, 2015

(51) Int. Cl.
| | |
|---|---|
| *G06T 19/00* | (2011.01) |
| *G06T 19/20* | (2011.01) |
| *G06T 17/10* | (2006.01) |
| *G06T 7/40* | (2017.01) |
| *G06T 15/20* | (2011.01) |

(52) U.S. Cl.
CPC ............... *G06T 19/20* (2013.01); *G06T 7/40* (2013.01); *G06T 15/20* (2013.01); *G06T 17/10* (2013.01)

(58) Field of Classification Search
CPC   G06T 19/20; G06T 7/40; G06T 15/20; G06T 17/10
See application file for complete search history.

(56) References Cited

U.S. PATENT DOCUMENTS

| | | | | |
|---|---|---|---|---|
| 5,146,212 A | * | 9/1992 | Venolia | G09G 5/08 345/619 |
| 5,463,722 A | * | 10/1995 | Venolia | G06F 3/04845 345/157 |
| 5,701,403 A | * | 12/1997 | Watanabe | G06T 17/10 345/419 |
| 5,966,132 A | * | 10/1999 | Kakizawa | A63F 13/10 345/419 |
| 6,011,581 A | * | 1/2000 | Swift | G02B 27/0093 345/419 |
| 6,252,603 B1 | * | 6/2001 | Oxaal | G03B 37/02 345/427 |
| 6,271,853 B1 | * | 8/2001 | Oxaal | G03B 37/02 715/848 |

(Continued)

OTHER PUBLICATIONS

D. Aiger et al., "4-Points Congruent Sets for Robust Pairwise Surface Registration", ACM Transactions on Graphics—Proceedings of ACM Siggraph 2008, Aug. 2008, vol. 27, Issue 3, Article No. 85.

(Continued)

*Primary Examiner* — Manav Seth
(74) *Attorney, Agent, or Firm* — McDonnell Boehnen Hulbert & Berghoff LLP

(57) ABSTRACT

Methods and apparatus for aligning objects are provided. A computing device can receive first and second object representations that are respectively associated with first and second surface representations. The computing device can apply an object transformation to the respective first and second object representations to modify geometric features of the respective first and second object representations based on one or more values of one or more characteristics of the respective first and second surface representation. The computing device can align the first object representation and the second object representation using an alignment of the transformed first object representation and the transformed second object representation. The computing device can provide an output based on the aligned first object representation and second object representation.

20 Claims, 9 Drawing Sheets

(56) References Cited

U.S. PATENT DOCUMENTS

| | | | | |
|---|---|---|---|---|
| 6,400,364 B1* | 6/2002 | Akisada | G06T 15/20 345/420 |
| 6,421,048 B1* | 7/2002 | Shih | G06F 3/016 345/419 |
| 6,515,659 B1* | 2/2003 | Kaye | G06T 17/20 345/419 |
| 6,686,921 B1* | 2/2004 | Rushmeier | G06T 17/10 345/423 |
| 6,762,757 B1* | 7/2004 | Sander | G06T 17/20 345/420 |
| 6,912,293 B1* | 6/2005 | Korobkin | G06T 17/10 345/420 |
| 6,952,204 B2* | 10/2005 | Baumberg | G06T 17/10 345/420 |
| 6,954,212 B2* | 10/2005 | Lyons | G06T 17/10 345/424 |
| 7,102,635 B2* | 9/2006 | Shih | G06F 3/016 345/419 |
| 7,542,034 B2* | 6/2009 | Spooner | G06T 15/20 345/419 |
| 7,561,165 B2* | 7/2009 | Strassenburg-Kleciak | G01C 15/00 345/522 |
| 7,639,267 B1* | 12/2009 | Desimone | G06F 17/5086 345/420 |
| 7,643,024 B2* | 1/2010 | Bell | G06T 15/40 345/419 |
| 7,934,869 B2* | 5/2011 | Ivanov | A61N 5/1049 378/20 |
| 7,948,488 B2* | 5/2011 | Liepa | G06F 17/50 345/423 |
| 7,961,184 B2* | 6/2011 | Nozaki | G06T 19/20 345/419 |
| 8,009,164 B2* | 8/2011 | Sendhoff | G06T 19/20 345/419 |
| 8,515,205 B2* | 8/2013 | Weston | G06T 3/4007 358/450 |
| 8,659,600 B2* | 2/2014 | Kraemer | G06T 17/20 345/419 |
| 8,665,273 B2* | 3/2014 | Kajikawa | G06T 15/20 345/427 |
| 8,686,869 B2 | 4/2014 | Sharma et al. | |
| 8,766,997 B1* | 7/2014 | Hickman | G09G 5/00 345/420 |
| 9,036,898 B1* | 5/2015 | Beeler | G06T 19/20 382/154 |
| 9,436,987 B2* | 9/2016 | Ding | G06T 7/00 |
| 2002/0166978 A1 | 11/2002 | Momose et al. | |
| 2006/0244746 A1 | 11/2006 | England et al. | |
| 2011/0273442 A1 | 11/2011 | Drost et al. | |
| 2013/0009948 A1* | 1/2013 | Berger | G06T 19/00 345/419 |
| 2013/0127847 A1* | 5/2013 | Jin | G06T 17/20 345/420 |
| 2014/0125658 A1 | 5/2014 | Bell et al. | |

OTHER PUBLICATIONS

M. Aubry et al, "Painting-to-3D Model Alignment via Discriminative Visual Elements", ACM Transactions on Graphics, Mar. 2014, vol. 33, Issue 2, Article No. 14.
R. Gvili, "Iterative Closest Point", Jun. 4, 2003.
W. Niem et al., "Mapping Texture from Multiple Camera Views onto 3D-Object Models for Computer Animation", Sep. 6, 1995, Proceedings of the International Workshop on Stereoscopic and Three Dimensional Imaging.
F. Pomerleau et al., "Comparing ICP Variants on Real-World Data Sets", Autonomous Robots, Apr. 2013, vol. 34, Issue 3, pp. 133-148.
S. Rusinkiewicz et al., "Efficient Variants of the ICP Algorithm", May 28, 2001, Third International Conference on 3-D Digital Imaging and Modeling, pp. 145-152.
R. Szeliski, "Image Alignment and Stitching: A Tutorial", Dec. 10, 2006, Microsoft Research Technical Report MSR-TR-2004-92.
J. Weill et al. "Seamless Texturing of 3D Meshes of Objects with Multiple Views", U.S. Appl. No. 14/098,659, filed Dec. 6, 2013.
Wikimedia Foundation,"Scale-Invariant Feature Transform", Jan. 19, 2015, available via the Internet at en.wikipedia.org/w/index.php?title=Scale-invariant_feature_transform&oldid=643220109 (last visited Feb. 17, 2015).
Wikimedia Foundation,"Surf" (Speeded Up Robust Features), Jan. 28, 2015, available via the Internet at en.wikipedia.org/w/index.php?title=SURF&oldid=644581235 (last visited Feb. 17, 2015).
K. Xu et al., "Feature-Aligned Shape Texturing", Dec. 10, 2008, First ACM Siggraph Conference and Exhibition in Asia, Article No. 108.

* cited by examiner

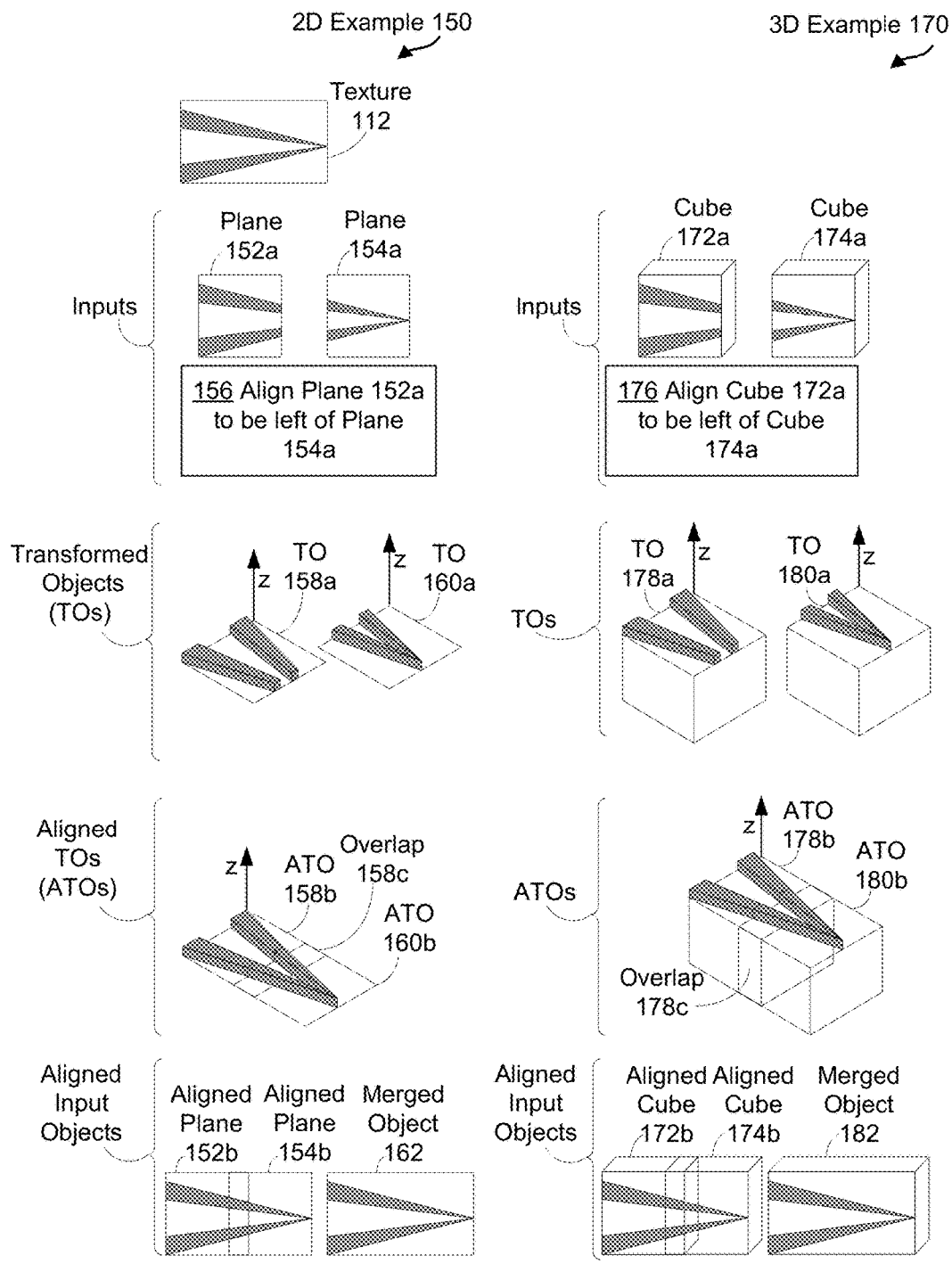

FEATURE AGNOSTIC GEOMETRIC ALIGNMENT

BACKGROUND

In computer graphics, three-dimensional modeling (3D) involves generation of a representation of a 3D surface of an object. The representation can be referred to as a 3D object data model, and can be rendered or displayed as a two-dimensional image via 3D rendering or displayed as a three-dimensional image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples. The 3D object data model can have one or more surfaces, and each surface can have surface characteristics, such as colors, lines, object depictions, text, and other characteristics.

Being a collection of data, 3D models can be created by hand, algorithmically, or objects can be scanned, for example. As an example, an artist can manually generate a 3D image of an object that can be used as the 3D model. As another example, a given object can be scanned from a number of different angles, and the scanned images can be combined to generate the 3D image of the object. As still another example, an image of an object can be used to generate a point cloud that can be algorithmically processed to generate the 3D image.

3D object data models can include solid models that define a volume of the object, or can include shell or boundary models that represent a surface (e.g. the boundary) of the object. Because an appearance of an object depends largely on an exterior of the object, boundary representations are common in computer graphics.

3D models are used in a wide variety of fields, and can be displayed using a number of different types of interfaces. Example interfaces can provide functionality to enable interaction between a user and the 3D models.

SUMMARY

In one aspect, a method is provided. A computing device receives at least a first object representation and a second object representation. The first object representation is associated with a first surface representation. The second object representation is associated with a second surface representation. The computing device applies an object transformation to the first object representation to modify one or more geometric features of the first object representation based on one or more values of one or more characteristics of the first surface representation. The computing device applies the object transformation to the second object representation to modify one or more geometric features of the second object representation based on one or more values of one or more characteristics of the second surface representation. The computing device aligning the first object representation and the second object representation using an alignment of the transformed first object representation and the transformed second object representation. The computing device provides an output that is based on the aligned first object representation and second object representation.

In another aspect, a computing device is provided. The computing device includes at least one processor and data storage. The data storage includes program instructions stored thereon that, when executed by the at least one processor, cause the computing device to perform functions. The functions include: receiving at least a first object representation and a second object representation, where the first object representation is associated with a first surface representation, and where the second object representation is associated with a second surface representation; applying an object transformation to the first object representation to modify one or more geometric features of the first object representation based on one or more values of one or more characteristics of the first surface representation; applying the object transformation to the second object representation to modify one or more geometric features of the second object representation based on one or more values of one or more characteristics of the second surface representation; aligning the first object representation and the second object representation using an alignment of the transformed first object representation and the transformed second object representation; and providing an output based on the aligned first object representation and second object representation.

In another aspect, a non-transitory computer readable medium is provided. The non-transitory computer readable medium has stored thereon instructions, that when executed by one or more processors of a computing device, cause the computing device to perform functions. The functions include: receiving at least a first object representation and a second object representation, where the first object representation is associated with a first surface representation, and where the second object representation is associated with a second surface representation; applying an object transformation to the first object representation to modify one or more geometric features of the first object representation based on one or more values of one or more characteristics of the first surface representation; applying the object transformation to the second object representation to modify one or more geometric features of the second object representation based on one or more values of one or more characteristics of the second surface representation; aligning the first object representation and the second object representation using an alignment of the transformed first object representation and the transformed second object representation; and providing an output based on the aligned first object representation and second object representation.

In another aspect, the present disclosure provides a computing device. The computing device includes: means for receiving at least a first object representation and a second object representation, where the first object representation is associated with a first surface representation, and where the second object representation is associated with a second surface representation; means for applying an object transformation to the first object representation to modify one or more geometric features of the first object representation based on one or more values of one or more characteristics of the first surface representation; means for applying the object transformation to the second object representation to modify one or more geometric features of the second object representation based on one or more values of one or more characteristics of the second surface representation; means for aligning the first object representation and the second object representation using an alignment of the transformed first object representation and the transformed second object representation; and means for providing an output based on the aligned first object representation and second object representation.

BRIEF DESCRIPTION OF THE FIGURES

FIG. 1B depicts a two-dimensional example of the method of FIG. 1A, in accordance with an example embodiment.

FIG. 1C depicts a three-dimensional example of the method of FIG. 1A, in accordance with an example embodiment.

DETAILED DESCRIPTION

Figure 1A:
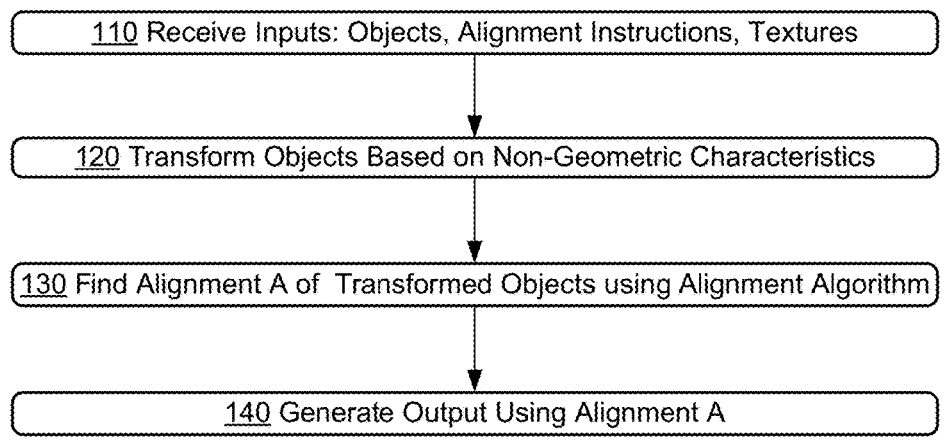
FIG. 1A is a flowchart for a method, in accordance with an example embodiment.

Disclosed are methods and apparatus for aligning multiple input objects in similar conditions (e.g., the objects have sufficient overlap for the alignment to be non-ambiguous). Within examples, pairwise object (N=2) cases are described. The input objects can be aligned based on non-geometric features, such as images related to the input objects. As an example, consider two square pieces of paper printed on one surface each. In this example, the printing on the surfaces of the two pieces of paper show, with some overlap, a common image (e.g., an image of an object, a word, a drawing, an outdoor scene) when the two pieces of paper are properly aligned. Since the pieces of paper are each invariant to rotations around the axes of the pieces of paper, there are multiple ways to align the pieces of paper if information about the common image is not used. However, there is usually only one way to align the papers to properly show the common image. In many cases where a transformation that aligns two objects is ambiguous based on geometric-only alignments, non-geometric features can be used to disambiguate the ambiguous transformation.

The herein-described techniques encode non-geometric features into the geometry of an object; that is, an initial object is transformed into a transformed object based on the non-geometric features. Any existing alignment algorithm that does not take non-geometric features into account can be used, without modification, as a building block for such techniques. That is, utilizing techniques for aligning transformed objects enables use of existing geometric alignment algorithms as "black box" components operating on transformed objects. Further, these techniques avoid modifications to existing algorithms to support alignment based on non-geometric features.

Non-geometric information can be expressed using a variety of techniques. For example, one scalar value, such as a greyscale value, can be used to represent non-geometric features of a surface. In other examples, a vector of scalar (or other types of) values can be used to represent non-geometric features of a surface; e.g., the vector can include a vector of color values and/or feature descriptors such as provided by a feature detection algorithm operating on one or more images. Other techniques are possible as well.

In some scenarios, the herein-described techniques can be used to align 2D or 3D data of the same object observed in arbitrary orientations and/or from multiple sources, where many such objects cannot be aligned using only geometric features. Further, the herein-described techniques can be used to refine alignment of 2D or 3D data acquired at multiple times. In other scenarios, 3D reconstruction systems can utilize these techniques for example, to align 3D data of the same scene from multiple sources. In still other scenarios, these techniques can be used in applications that cluster and/or search for similar 3D objects (eliminating near-duplicates, etc.) and 3D objects search. Also, the herein-described techniques can be used to enhance alignment tools used in computer-aided drawing (CAD) applications.

Techniques for Aligning Objects Utilizing Non-Geometric Features

FIG. 1A is a flowchart of method 100, in accordance with an example embodiment. Method 100 can be carried out by a computing device, such as, but not limited to, computing device 400 described below in the context of FIG. 4.

Method 100 can begin at block 110, where the computing device can receive inputs including representations of the objects to be aligned, alignment instructions, and perhaps a texture or other non-geometric information. The objects to be aligned can be of any dimension, such as 2D objects, 3D objects, or other dimensional objects. In some embodiments, the objects to be aligned can all have the same dimension; e.g., all the objects to be aligned are 2D objects. Alignment instructions can specify which objects are to be aligned.

FIG. 1B shows a two-dimensional example 150 of method 100, in accordance with an example embodiment. In example 150, the inputs include representations of input objects and alignment instructions, where the input objects are two-dimensional planes 152a and 154a, and the alignment instructions are alignment instructions 156 indicating that planes 152a and 154a are to be aligned so that plane 152a is left of plane 154a. In example 150, planes 152a and 154a depict overlapping portions of pattern 112, as some alignment algorithms utilize overlap between input objects, like planes 152a and 154a, to align the input objects.

FIG. 1C shows a three-dimensional example 170 of method 100, in accordance with an example embodiment. In example 170, the inputs include representations of input objects and alignment instructions, where the input objects are three-dimensional cubes 172a and 172b, and the alignment instructions are alignment instructions 176 indicating that cubes 172a and 172b are to be aligned so that cube 172a is left of cube 172b. In example 170, cubes 172a and 174a depict overlapping portions of pattern 112, as some alignment algorithms utilize overlap between input objects, like cubes 172a and 174a, to align the input objects.

In some cases, the alignment instructions can be implicitly or otherwise provided. For example, (representations of) input objects can be numbered 1, 2, 3, . . . N, with the implicit instruction that (a representation of) object 1 is to be aligned to be adjacent and to the left (or some other direction) of (a representation of) object 2, where object 2 is to be aligned to be adjacent and to the left (or the other direction) of (a representation of) object 3, and so on. In another example, (representations of) input objects can be numbered using a 2D system e.g., (representation of) object (1, 1), (representation of) object (1, 2), and so the (representations of) objects can have implicit instructions that (a representation of) object (x, y) is to be to the left of a representation of) object (x, y+1) and above a representation of) object (x, y+1). Similar implicit instructions can be used for 3D or other dimensional numbering schemes.

A texture can be used to align (representations of) objects, such as example texture 112 depicted in FIG. 1B. A texture can be an image to be applied as a color map to aligned surfaces of the input objects. The texture can be an image depicted on surfaces of the input. For example, FIG. 1B shows that portions of texture 112 are shown on surfaces of planes 152a and 154a, and FIG. 1C shows that portions of texture 112 are shown on surfaces of cubes 172a and 174a. In some examples, the texture can be part of the alignment instructions; e.g., for example 150, the alignment instructions could include instructions to align planes 152a and 154a so that their respective surfaces depicted in FIG. 1B are aligned to portray texture 112.

In other examples, multiple textures can be provided; for example, different textures and/or vectors can be applied to different portions of aligned input objects. As another example, the textures can be combined and then used to align input objects and/or applied to already-aligned input objects. Similar texture-based alignment instructions can be provided for example 170 of FIG. 1C.

In other examples, the (representations of) input objects can be aligned based on non-geometric features of their respective surfaces and the texture can be applied to surfaces of the input objects after alignment. For example, suppose that a texture depicted a desired depiction, such as a brand-new (or aged) version of a sign, while surfaces of the input objects depicted a less desired depiction, such as an aged (or new) version of the sign depicted by the texture—this allows the texture to be used as a tool to better portray the input objects; e.g., to show a desired version of an object displayed with the texture rather than the version already depicted on the surfaces of the input objects.

As indicated by FIG. 1A, at block 120 of method 100, the computing device can transform the (representations of) input objects based on non-geometric characteristics, such as characteristics of the surfaces of the input objects and/or a texture provided at block 110. For example, if the alignment instructions are to align input objects to portray an image depicted on surfaces of the input objects or to portray a texture, then the input objects can be transformed based on texture or surface image characteristics, such as characteristics related to colors, surfaces of the objects (such as one or more materials represented by and/or used to fashion surfaces of the input objects), noise-related characteristics of an image (e.g., noise density value(s) over part or all of a surface), characteristics of objects portrayed on the surfaces/textures (e.g., locations and/or orientations of lines, numbers, letters, text, objects, etc. in the image), and/or other characteristics of the surfaces/textures.

One example transformation modifies geometric aspects (a representation of) an input object based on the color depicted on a surface of the object. For example, suppose planes 152a and 154a of example 150 each lie in the z=0 plane. Then, one normal to each of planes 152a and 154a would be in the positive z direction—these normals are depicted with respective upward arrows labeled with a respective "z" for each of respective (representations of) transformed objects (TOs) 158a and 160a as shown in FIG. 1B. The example transformation can then transform a point P on the surface of an input object O by translating P along the direction of V, where the direction of V can be the direction of the normal of O at P, and where the magnitude of V can be specified in terms of a transformation value, where the transformation value can be based on a color of a texture at a point corresponding to P or a color of a surface of O at P. For example, let the color of a surface of O at P be (255, 255, 255) with the color as expressed as a Red Green Blue (RGB) triple (R, G, B) whose R (for red), G (for green), and B (for blue) values each range from 0 to 255. Then, the transformation value at P can be based on the (255, 255, 255) color value at P.

Another example transformation modifies geometric aspects (a representation of) an input object based on the color depicted on a texture. The texture can be mapped to one or more particular surfaces of the one or more of the objects to be aligned in a bijective fashion, i.e. a point (u, v) in the texture can be mapped to a point (x, y) if a particular surface is a 2D surface or mapped to every point (x, y, z) if a particular surface is a 3D surface for all points in the particular surface. This mapping can associate each point of the one or more particular surfaces a color value, such as an RGB triple. Then, the transformation value at a point P on the one or more particular surfaces can be based on the associated color value.

In still other embodiments, other non-geometric information than a texture can be provided. For example, (non-texture) augmented data can be specified for one or more particular surfaces, such as by specifying the augmented data at vertices of the one or more particular surfaces. That is, at block 110, inputs related to non-geometric information can specify vectors of scalar values V1, V2 . . . Vv, v>0, where v is the number of vertices of one or more particular surfaces of the input objects to be aligned. Each vector of scalar values V1, V2 . . . Vv can take form Vi=(s1, s2 . . . sn), for 1≤i≤v, and for n>0, where the vector of scalars represent the augmented data. For a non-vertex point P of the one or more particular surfaces, a corresponding vector VP=(s1, s2 . . . sn) can be determined using interpolation or another technique to determine values at points other than at the vertices.

A scalar transformation value TV(Q) for a point Q on the one or more particular surfaces can be determined. Let Q be associated with a vector of scalars VQ=(q1, q2 . . . qn). Then, TV(Q) can be a scalar value associated with VQ via a scalar transformation of vector VQ; e.g., the $L^1$ norm of VQ, the $L^2$ norm of VQ, another Euclidean (or other) norm of VQ, an average of the q1 . . . qn scalar values of VQ, a weighted average of the q1 . . . qn scalar values of VQ, or another scalar-valued function operating on some or all of the values of VQ.

In example 150, the example transformation can be used to move each point on planes 152a and 154a to move each non-white portion in the direction of a normal to each plane. In FIG. 1B, the normal to (representation of) transformed object 158a, which is a transformation of plane 152a, is shown using an upward pointing arrow labeled with a "z". The effect of the example transformation is to move the non-white portions of (a representation of) transformed object 158a upward while leaving the white portions of (a representation of) transformed object 158a the same as (non-transformed) plane 152a, as shown in FIG. 1B. Similarly, the non-white portions of (a representation of) transformed object 160a have been moved upward and the white portions of (a representation of) transformed object 160a remain the same as (non-transformed) plane 154a as also shown in FIG. 1B.

In example 170 of FIG. 1C, the example transformation can be used to move non-white portions of cubes 172a and 174a in the direction of normals to planes of cubes 172a and 174a having the non-white portions. In FIG. 1C, the normals to upward facing planes of (representations of) respective transformed objects 178a and 180a, which include respective transformations of (representations of) respective planes of cubes 172a and 174a, are each shown using an upward pointing arrow labeled with a "z". The effect of the example transformation is to move the non-white portions of respective (representations of) transformed objects 178a and 180a upward while leaving the white portions of respective (representations of) transformed objects 178a and 180a the same as non-transformed planes of respective (representations of) cubes 172a and 174a, as shown in FIG. 1C.

As indicated by FIG. 1A, at block 130 of method 100, the computing device can find an alignment A of the (representations of the) transformed objects using an alignment algorithm operating on the transformed objects. Example alignment algorithms include, but are not limited to, the Iterative Closest Point (ICP) algorithm, variants of the ICP algorithm, and algorithms for aligning "almost-aligned" objects. As shown in example 150 of FIG. 1B, the transformed objects 158a, 160a can be aligned using an alignment algorithm and oriented based on a resulting alignment $A_{150}$ as aligned transformed objects (ATOS) 158b, 160b, where alignment $A_{150}$ aligns transformed objects 158a, 160a. Aligned transformed objects 158b, 160b overlap since input objects 152a and 154a overlap —a region where aligned transformed objects 158b and 160b overlap is shown in FIG. 1B as overlap 158c.

Regarding example 170, FIG. 1C shows transformed objects 178a, 180a aligned by an alignment algorithm and oriented based on a resulting alignment $A_{170}$ as aligned transformed objects 178b, 180b, where alignment $A_{170}$ aligns transformed objects 178a, 180a. Aligned transformed objects 178b, 180b overlap since input objects 172a and 174a overlap—a region where aligned transformed objects 178b and 180b overlap is shown in FIG. 1C as overlap 178c.

As indicated by FIG. 1A, at block 140 of method 100, the computing device can generate output based on the alignment A obtained at block 130. In particular, the (representations of) the input objects can be aligned by applying alignment A to the (representations of) the input objects; that is, the same alignment found in block 130 to align the (representations of the) transformed objects can be used to align the (representations of) the input objects.

Example outputs include an output of the aligned objects, an output of a representation of the aligned objects, such as an image, object, data structure, or other entity that the computing device can utilize as an embodiment of one or more aligned objects, an output of a representation of and/or data related to alignment A, an output showing how the input objects can be moved to be aligned, an output of a representation of the aligned objects after a texture has been applied to surfaces of the aligned objects, and/or other outputs related to the aligned objects. In some examples, an alignment algorithm will generate a merged object from the input objects; while other algorithms do not merge the input objects; rather a specification of one or more transformations, such as affine transformations, of one (or both) input objects leading to alignment can be generated.

FIG. 1B shows an output for example 150 where input planes 152a, 154a have placed into alignment using alignment $A_{150}$ as resulting aligned planes 152b, 154b. In some cases, the output for example 150 can be merged object 162 made up of input planes 152a, 154a. Additionally, FIG. 1C shows an output for example 170 where input planes 172a, 174a have placed into alignment using alignment $A_{170}$ as resulting aligned cubes 172b, 174b. In some cases, the output for example 150 can be merged object 182 made up of input cubes 172a, 174a. In some embodiments, method 100 can terminate after completion of block 140.

Figure 2A:
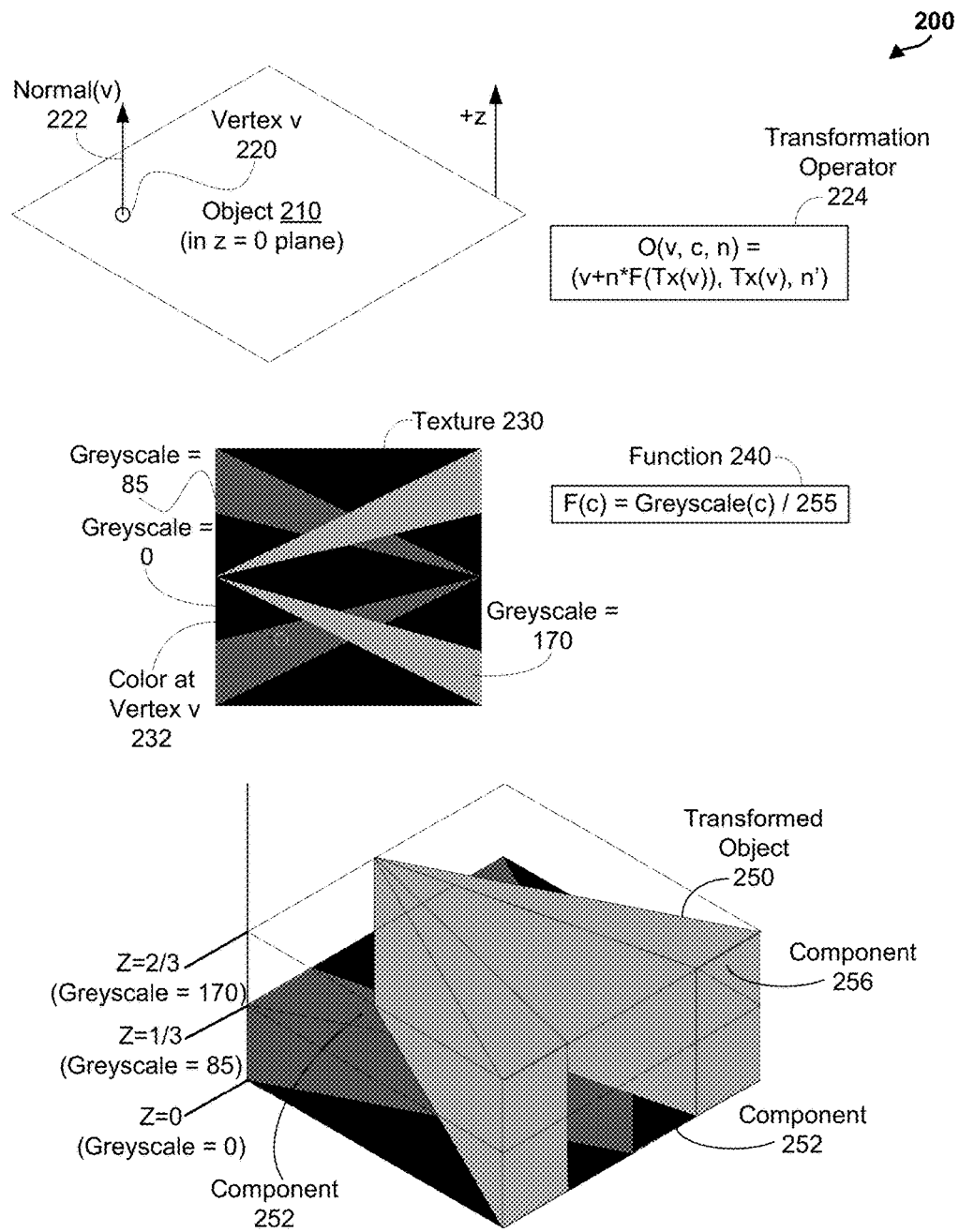
FIG. 2A illustrates a scenario of a transformation operator being used to transform an object, in accordance with an example embodiment.

FIG. 2A illustrates scenario 200 where transformation operator 224 is being used to transform object 210 into transformed object 250, in accordance with an example embodiment. In scenario 200, a 2D input object 210 is in 3D space, where object 210 lies in the z=0 plane. Object 210 has vertex 220 at a point in the interior of object 220 and has a normal 222 at vertex 220, where normal 222 is in the positive z direction as illustrated in FIG. 2A.

Scenario 200 involves transforming object 210 to represent non-geometric features of texture 230. FIG. 2A shows texture 230 with three colors: a black (greyscale value=0) background partially overlaid with darker-grey (greyscale value=85) and lighter-grey (greyscale value=170) triangles. In particular, at a point of texture 230 corresponding to vertex 220 v, the color 232 of texture 230 at a point corresponding to vertex 220 is that of a darker-grey triangle as shown in FIG. 2A.

Scenario 200 involves applying transformation operator 224 to object 210 and texture 230 to obtain transformed object 250. Regarding transformation operator 224, transformation operator O can transform an input object M into a transformed object Q; e.g., functionally, Q=O(M). Let $S_g$(M1, M2) be a measure of similarity between two objects A and B taking into account only geometric features of both objects M1 and M2. Let $S_{g+c}$(M1, M2) be a measure of similarity between two objects M1 and M2 taking into account both geometric and non-geometric features of both objects M1 and M2.

Operator O can be selected such that for any transformation T, similarity measure $S_{g+c}$(T(M1),M2)) is high if and only if corresponding similarity measure $S_g$(T(O(M1)),O(M2)) is high. Example selections of operator O include, but are not limited to, operations that:

Take points only from a specific feature cluster. In some embodiments, colors can be used as non-geometric features; in these embodiments, a color space, such as the Hue-Saturation-Lightness (HSL), Hue-Saturation-Value (HSV) or RGB color space, can be quantized to obtain values for operation O, Use texture edge points projected to a 3D space, Apply a rigid transformation on portions of non-geometric features that depend on colors, and/or Perform some or all of the functions of transformation operator 224.

Other transformation operators are possible as well.

As shown in FIG. 2A, transformation operator 224 can be expressed as O(v, c, n), with v being a point (vertex) on object 210, c being a color associated with point v, and n being a normal vector to object 210 at point v. In general, transformation operator 224 maps point v to transformed point Tv=v+n*F(c); maps color c to transformed color Tc=F(c), and maps normal n to transformed normal n', where F(c) is a function operating on color c, and n' is the normal at transformed point Tv of the transformed object.

In scenario 200, normalized normals are used; e.g., as object 210 lies flat in the z=0 plane, the normalized normals NN1, NN2 to a point p of object 210 are NN1={0, 0, +1} and NN2={0, 0, −1}. Unless otherwise stated, in scenario 210, positive normalized normal NN1 is to be used as the normal for any point in object 210.

In scenario 200, color c is determined using function Tx(v) that returns a color of texture 224 corresponding to point v on object 210. For example, if v=point 220, then Tx(v)={85, 85, 85} in the RGB color space; e.g., Tx(v) is color 232 of FIG. 2A. Then, using the equality c=Tx(v), in scenario 200, transformation operator 224 O(v, c, n)=(v+F (Tx(v)), Tx(v), n').

Further, in scenario 200, F(c) is function 240, which is F(c)=greyscale(c)/255, where greyscale(c) is the greyscale value for color c, where greyscale(c) ranges from 0 to 255. Example greyscale(c) values in the RGB color space include: R (the red-only value), G (the green-only value), B (the blue-only value), an average of two of the three R, G, and B values, an average of the three R, G, and B values, a weighted average of two of the three R, G, and B values, a weighted average of the three R, G, and B values, and perhaps other values. In the HSV color space, example greyscale(c) values can be calculated using greyscale(c)=V (c)/maxV*255, where V(c) is the V value for input color c, and maxV is the maximum possible V value (e.g., maxV=1 or 255). In the HSL color space, example greyscale(c) values can be calculated using greyscale(c)=L(c)/maxL*255, where L(c) is the lightness value L for input color c, and maxL is the maximum possible L value (e.g., maxL=1 or 255). Other determinations of greyscale(c) and function 240 F(c) are possible as well.

For the specific case of object 210, texture 230, and transformed object 250 of scenario 220, transformation operator 224 O(v, c, n) can be said to map:

input point v on object 210 into transformed point Tv of transformed object 250 with Tv=v+n*F(Tx(v))=v+n* (greyscale(Tx(v))/255), input color c to transformed color Tc with Tc=F(c)=greyscale(Tx(v)), and normal n for point v on object 210 to transformed normal n' at point Tv on transformed object 250.

Scenario 200 continues with object 210 being transformed into transformed object 250 by applying transformation operator 224 to points of object 210. As shown in FIG. 2A, transformed object 250 can be considered to have three components: component 252 associated with the z=0 value, component 254 associated with the z=1/3 value, and component 254 associated with the z=2/3 value.

For component 252 of transformed object 250, recall that the transformed color Tc=greyscale(Tx(v)). Then, for a transformed point TP1 for a point in the component 252, the z value of the input point v1 corresponding to TP1 is 0 as input object 210 lies in the z=0 plane. Applying transformation operator 224, the z component of TP1, z(TP1), is equal to z(v1)+z(n(v1))*F(Tx(v1)), where z(v1) is the z component of point v1, and z(n(v1)) is the z component of the normal n(v1) to object 210 at point v1. As TP1 is in the first component of transformed object 250, z(TP1)=0 and z(v1)=0 as object 210 lies in the z plane, then z(TP1)=0=z (v1)+z(n(v1))*F(Tx(v1))=z(n(v1))*F(Tx(v1)). Then as normalized normal NN1 is used for point v1, z(n(v1))=1, and so z(TP1)=F(Tx(v1)). As z(TP1)=0, then F(Tx(v1))=0, implying that the greyscale value of texture 230 at point v1 is 0, which corresponds to the black background of texture 230. Therefore, as indicated in FIG. 2A, component 252 of transformed object 250 corresponds to points of object 210 associated with the black background of texture 230, and so points of component 252 are colored black.

For component 254 of transformed object 250, for a transformed point TP2 for a point on an upper surface of component 254, the z value of the input point v2 corresponding to TP2 is 0 as input object 210 lies in the z=0 plane. Applying transformation operator 224, z(TP2)=z(v2)+z(n (v2))*F(Tx(v2)). As TP2 is on an upper surface the first component of transformed object 250, z(TP2)=1/3 and z(v2)=0 as object 210 lies in the z plane, then z(TP2)=z(v2)+z (n(v2))*F(Tx(v2))=z(n(v2))*F(Tx(v2)). Then as normalized normal NN1 is used for point v2, z(n(v2))=1, so z(TP2)=F (Tx(v2)). As z(TP2)=1/3, F(Tx(v2))=1/3, implying that the greyscale value of texture 230 at point v1 is 85, which corresponds to the darker-grey triangle of texture 230. Therefore, as indicated in FIG. 2A, component 254 of transformed object 250 corresponds to points of object 210 associated with the darker-grey triangles of texture 230, and so points of component 254 are colored darker-grey. A similar calculation indicates that points in the upper surface of component 256 having z=2/3 values correspond to points in object 210 that correspond to the lighter-grey triangles of texture 230 which have greyscale values of 170. Therefore, transformation operator 224 has transformed object 210 into transformed object 250 based on non-geometric features; e.g., colors of texture 230, that are associated with object 210.

Figure 2B:
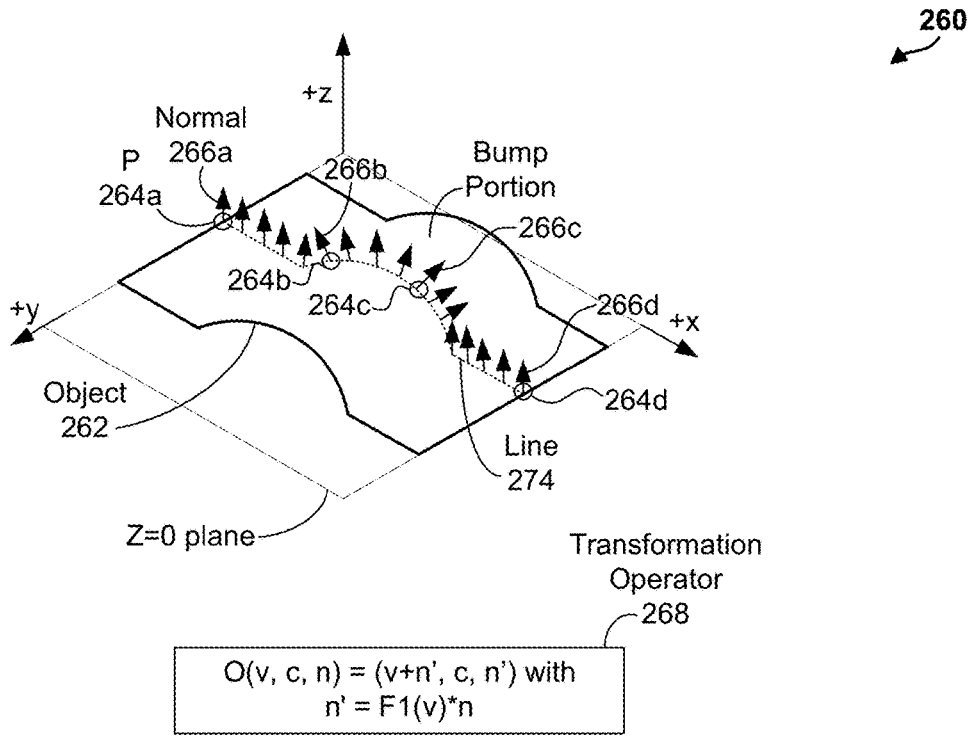
FIG. 2B illustrates another scenario of using a transformation operator to transform an object, in accordance with an example embodiment.
Figure 2B:
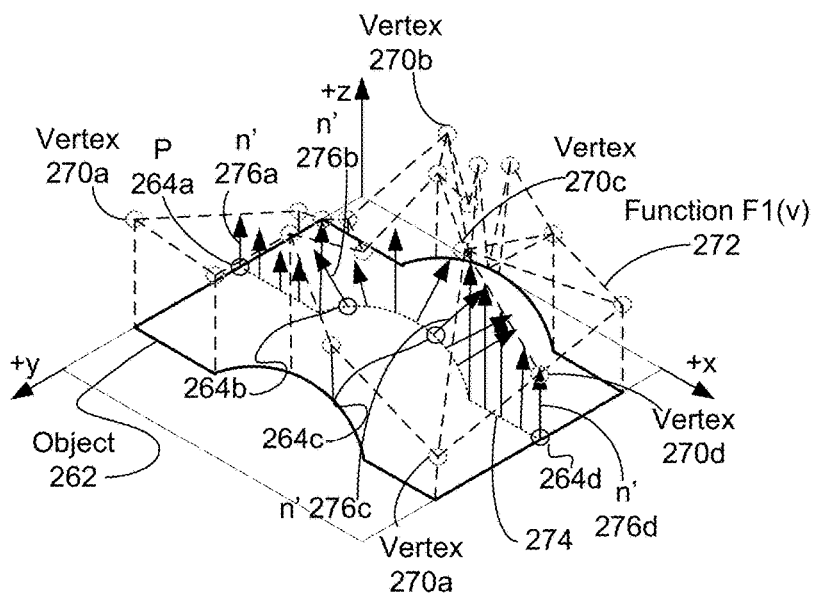

FIG. 2B illustrates scenario 260 where transformation operator 268 is being used to transform object 262, in accordance with an example embodiment. In scenario 260, a 3D input object 262 is in 3D space, where object 262 partially lies in the z=0 plane. As shown in FIG. 2B, object 262 includes a central "bump" portion that rises above the z=0 plane. FIG. 2B shows unit normals along an example line 274 parallel to the x axis traversing object 262. The normals include normal 266a at point 264a at a left edge of object 262, normal 266b at point 264b in a left part of the bump portion, normal 266c at point 264c in a right part of the bump portion, and normal 266d at point 264d at a right edge of object 262. FIG. 2B shows that normals 266a and 266d are both vectors in the positive z direction from respective points 264a and 264d, normal 266b is a vector in the negative x and positive z directions from point 264b, and normal 266c is a vector in the positive x and positive z directions from point 264c.

Scenario 200 involves transforming object 260 using transformation operator 268 that can be expressed as O(v, c, n), with v being a point (vertex) on object 262, c being a color associated with point v, and n being a normal vector to object 262 at point v. In general, transformation operator 268 maps point v of object 262 to transformed point Tv1=v+n'; maintains the input color c through the transformation, and maps normal n to transformed normal n', where n'=F1(v)*n, where F1(v) is shown in FIG. 2B as function F1(v) 272.

Function F1(v) 272 represents non-geometric features F(v) 272, where v is a vertex (or point) on object 262. As shown at the lower portion of FIG. 2B, function F1(v) 272 is specified by data at approximately 20 vertices of object 262. Each vertex for function F1(v) 272 is shown as a grey-lined circle above object 262 in the lower portion of FIG. 2B. The non-geometric features specified at the vertices of function F1(v) 272 can be specified as a vector of one or more scalar values. Then, the vector of values can be transformed to a scalar value using a scalar transformation; i.e., taking a norm or average of the scalar values of the vector. Example scalar transformations are discussed above in the context of FIG. 1.

The resulting scalar value can specify the value of F1(v) at the vertex; e.g., if a vertex VV is associated with a vector VVq of non-geometric values [VVq1, VVq2 ... VVqn], n>0, then a scalar transformation T=S(V) can be applied to vector VVq to obtain a scalar value TVV corresponding to vector VVq. Then, the function F1 272 at vertex VV, F1(VV) can be set equal to TVV. For a point PP on object 262 that is not a vertex of function F1 272, two or more of the values specified at vertices of function F1 272 can be interpolated or otherwise combined to obtain a value for function F1 272 at point PP. The depiction of function F1(v) 272 of FIG. 2B utilizes interpolations, shown using dashed lines between vertices of function F1(v) 272, to determine values of function F1 272 for points other than F1's vertices.

The lower portion of FIG. 2B shows that values of function F1 272 have been used to scale the normals along line 274 and so generate respective transformed normals n' 276a, 276b, 276c, 276d at respective points 264a, 264b, 264c, 264d of object 262. Transformed normal n' 276a is shown as being somewhat longer than normal 266a after being scaled by F1 (point 264a), while each of transformed normals 276b, 276c, 276d are shown as being markedly longer than respective normals 266b, 266c, 266d after being scaled by respective values F1(point 264b), F1 (point 264c), and F1 (point 264d). After transformed normals n' have been calculated for on object 262, the transformed normals n' can be used to transform points on object 262 according to transformation operator 268; e.g., point v on object 262 can be transformed by v=v+n', where n' is the transformed normal at point v, such as discussed above in the context of FIG. 2A.

Figure 3A:
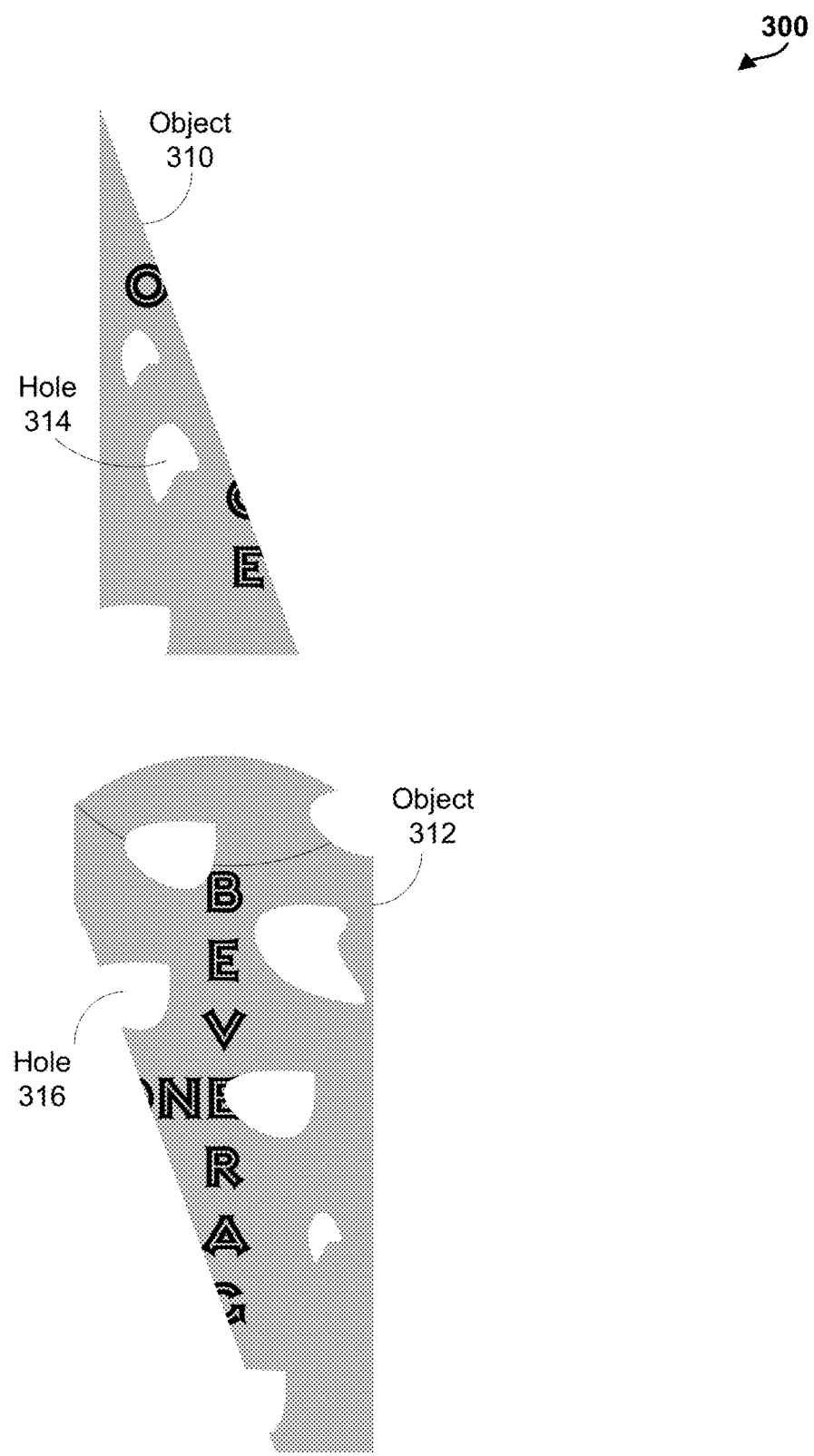
FIGS. 3A, 3B, and 3C illustrate a scenario where two objects are aligned and then merged and a texture is then applied to the merged object, in accordance with an example embodiment.
Figure 3B:
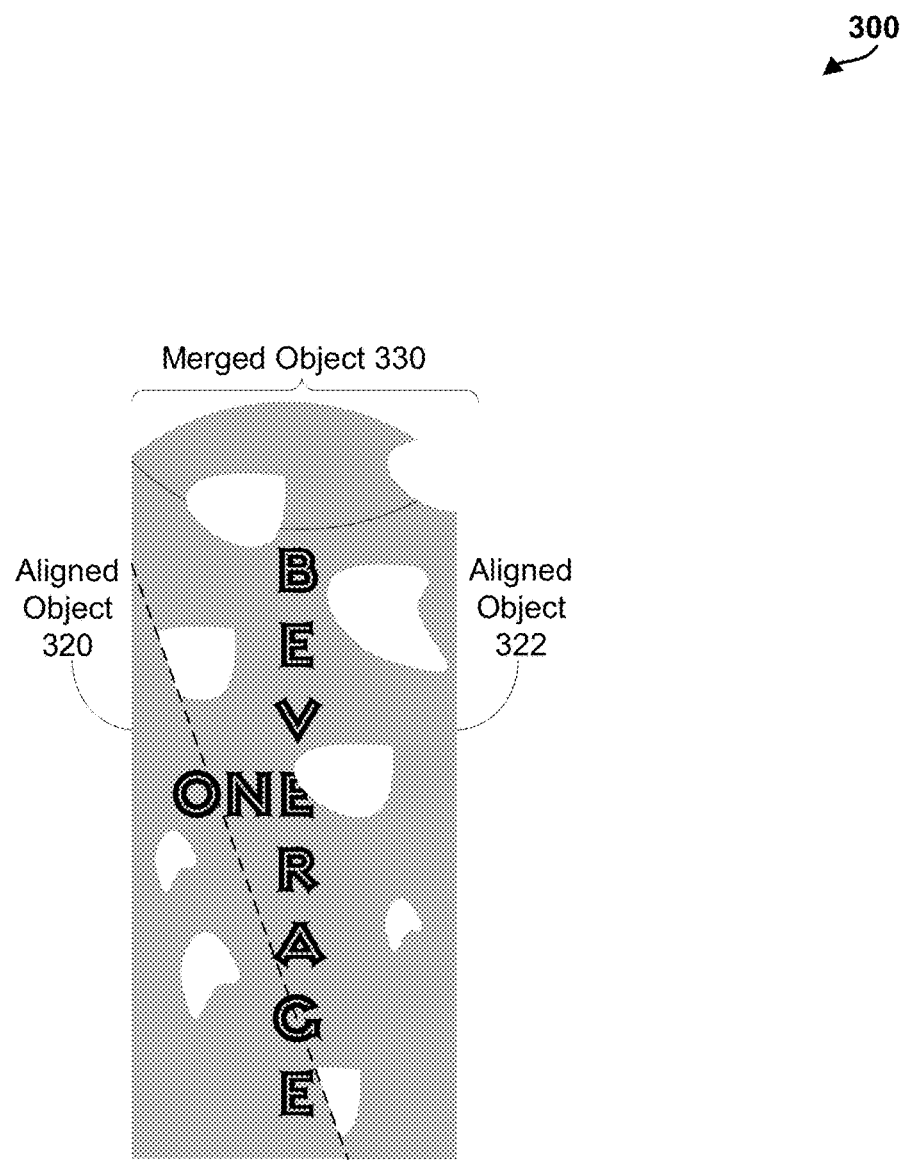
Figure 3C:
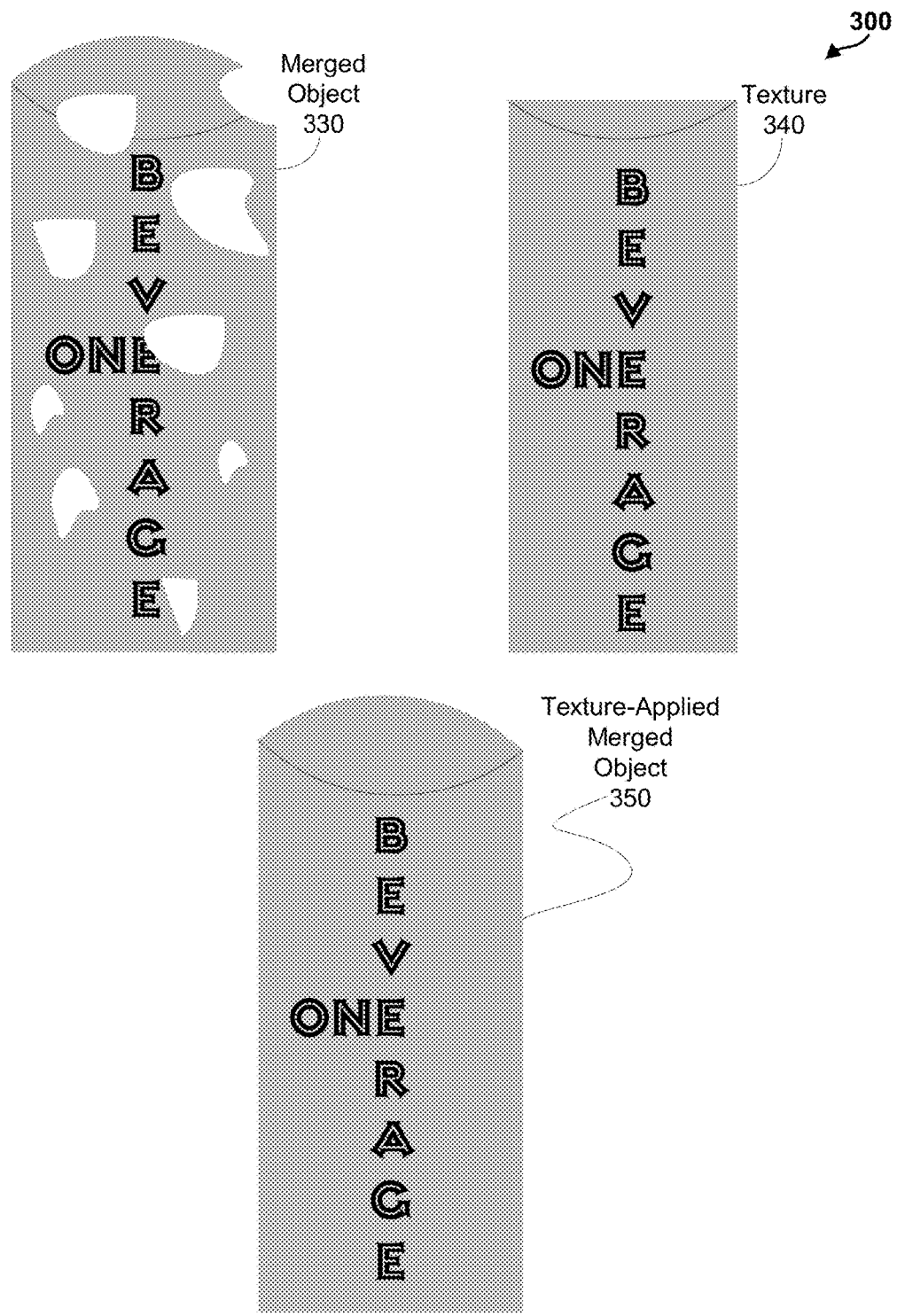

FIGS. 3A, 3B, and 3C illustrate scenario 300, in accordance with an example embodiment. Scenario 300 can be carried out by a computing device, such as, but not limited to, computing device 400 discussed below in the context of FIG. 4. In scenario 300, the computing device aligns representations of two objects, merges the representations of the two aligned objects, and applies a texture to the merged object. Scenario 300 illustrates how object alignment and texture application can be used to correct errors in object representations, such as filling gaps related to erroneous data representing input objects.

Scenario 300 begins with the computing device receiving representations of two input objects, shown as objects 310 and 312 of FIG. 3A. Objects 310 and 312 each have various holes; e.g., hole 314 in object 310 and hole 316 in object 312. In scenario 300, the holes in objects 310 and 312 shown in FIG. 3A indicate portions of each object where data was unavailable, incomplete, garbled, and/or otherwise incorrect for the representation of that object.

The computing device then applies method 100 of FIG. 1A to align the representations of objects 310 and 312 based on non-geometric characteristics of objects 310 and 312. FIG. 3B shows that, after method 100 is applied, the representations of objects 310 and 312 have each been moved to be in alignment as respective representations of aligned objects 320 and 322. In particular, the representation of aligned object 330 is aligned with the representation of aligned object 322 along a diagonal, where the diagonal is shown as a dashed line in FIG. 3B. The computing device can merge aligned objects 320, 322 into merged object 330, as illustrated both in FIG. 3B and at upper left of FIG. 3C.

Scenario 300 continues with the computing device applying texture 340, shown at upper right of FIG. 3C, to merged object 330 to generate texture-applied merged object 350, thereby covering holes and correcting errors in the depiction of merged object 330. FIG. 3C shows texture-applied merged object 350 in the lower portion of the figure. In other scenarios, other flaws in objects, such as creases, off-colored portions, errors in non-geometric aspects of input objects (e.g., a misspelled word, a blurry image or other errors on surface(s) of the objects). In some embodiments, scenario 300 can end after the computing device generates texture-applied merged object 350.

Computing Device Architecture

Figure 4:
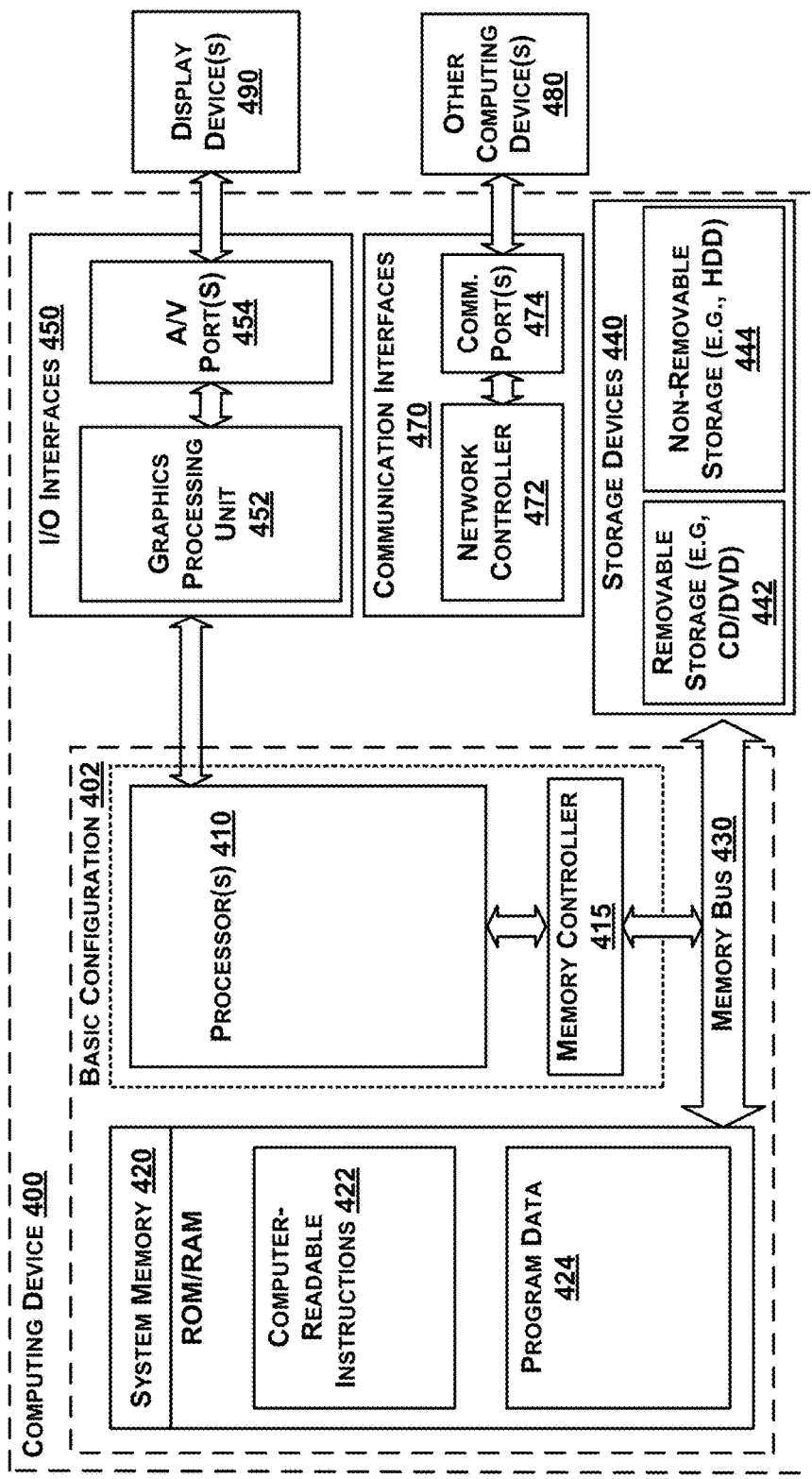
FIG. 4 is a block diagram illustrating a computing device used in a computing system, in accordance with an example embodiment.

FIG. 4 is a block diagram illustrating computing device 400 used in a computing system, in accordance with an example embodiment. Computing device 400 can be implemented as a portion of a small-form factor portable (or mobile) electronic device such as a cell phone, a personal data assistant (PDA), a personal media player device, a wireless web-watch device, a wearable device, a personal headset device, an application specific device, video game system, global positioning system, or a hybrid device that include any of the above functions. Computing device 400 can also be implemented as a personal computer including both laptop computer and non-laptop computer configurations. Computing device 400 can be configured to perform some or all of method 100 and/or method 500 and/or some or all of the functionality associated with scenario 200, scenario 260, and/or scenario 300.

In a basic configuration 402, computing device 400 can include one or more processors 410 and system memory 420. Memory bus 430 can be used for communicating between processor(s) 410 and system memory 420. Depending on the desired configuration, processor(s) 410 can include one or more general purpose processors and/or one or more special purpose processors (e.g., digital signal processors, application specific integrated circuits, etc.). Processor(s) 410 can be configured to execute computer-readable instructions 422 that are contained in the system memory 420 and/or other instructions as described herein. Memory controller 415 can also be used with processor(s) 410, or in some implementations, memory controller 415 can be an internal part of processor(s) 410.

System memory 420 can include computer-readable instructions 422 and perhaps program data 424. Computer-readable instructions 422 can include instructions that, when executed by one or more of processor(s) 410, cause computing device 400 to perform some or all of the functionality related to method 100, scenario 200, scenario 260, scenario 300, and/or method 500. In some example embodiments, computer-readable instructions 422 can be arranged to operate with program data 424 on an operating system.

Computing device 400 can have additional features or functionality, and additional interfaces to facilitate communications between the basic configuration 402 and any devices and interfaces.

Depending on the desired configuration, system memory 420 and/or data storage devices 440 can include one or more computer-readable storage media that can be read and/or accessed by at least one of processor(s) 410. Computer-readable storage media can include volatile and/or nonvolatile, non-transitory, removable and non-removable media implemented in any method or technology for storage of information, such as computer readable instructions, data structures, program modules, or other data, which can be integrated in whole or in part with at least one of processor(s) 410.

Computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of device 400. For example, data storage devices 440 can be provided including removable storage devices 442, non-removable storage devices 444, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few.

In some embodiments, system memory 420 and/or data storage devices 440 can be implemented using a single physical device (e.g., one optical, magnetic, organic or other memory or disc storage unit), while in other embodiments, system memory 420 and/or data storage devices 440 can be implemented using two or more physical devices.

Computing device 400 can also include input/output (I/O) interfaces 450 that can be operable to send data to and/or receive data from external user input/output devices. For example, some or all of input/output (I/O) interfaces 450 can be configured to send and/or receive data to and/or from user input devices such as a keyboard, a keypad, a touch screen, a computer mouse, a track ball, a joystick, a camera, a voice recognition module, and/or other similar devices. Some or all of input/output (I/O) interfaces 450; e.g., A/V port 454, can also be configured to provide output to user display devices 490. User display devices 490 can include, but are not limited to, one or more: cathode ray tubes (CRT), liquid crystal displays (LCD), light emitting diodes (LEDs), displays using digital light processing (DLP) technology, printers, light bulbs, and other similar devices. Some or all of input/output (I/O) interfaces 450; e.g., A/V port 454, can also be configured to provide inputs to one or more devices that generate audible output(s), such as, but not limited to: speakers, speaker jacks, audio output ports, audio output devices, earphones, and other similar devices.

Communication interface 470 can include a network controller 472, which can be arranged to facilitate communications with one or more other computing devices 480 over a network via one or more communication ports 474. Communication interface 470 can include one or more wireless interfaces and/or one or more wireline interfaces that are configurable to communicate via the above-mentioned network. The one or more wireless interfaces can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. The one or more wireline interfaces can include one or more wireline transmitters, receivers, and/or transceivers, such as an Ethernet transceiver, a Universal Serial Bus (USB) transceiver, or a similar transceiver configurable to communicate via a twisted pair wire, a coaxial cable, a fiber-optic link, or a similar physical connection to a wireline network.

In some embodiments, communication interface 470 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Example Methods of Operation

Figure 5:
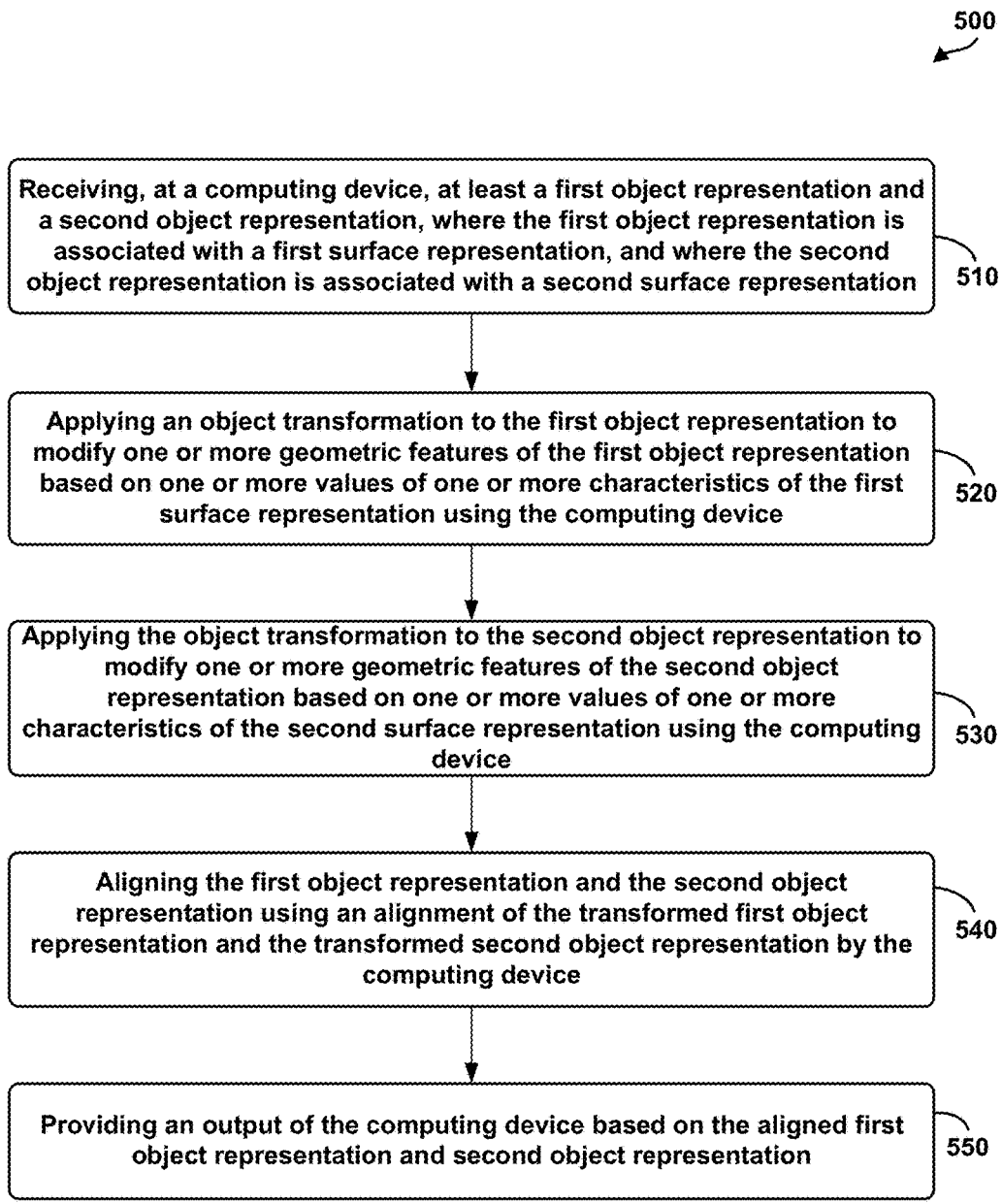
FIG. 5 is a flowchart of another method, in accordance with an example embodiment.

FIG. 5 is a flowchart of method 500, in accordance with an example embodiment. Method 500 can be carried out by a computing device, such as, but not limited to, computing device 400.

Method 500 can begin at block 510, where the computing device can receive, at least a first object representation and a second object representation, where the first object representation is associated with a first surface representation, and where the second object representation is associated with a second surface representation. Example object representations are discussed above at least in the context of: planes 152a, 152b, 154a, 154a of FIG. 1A, cubes 172a, 172b, 174a, 174b of FIG. 1B, and objects 210, 310, and 312 of FIGS. 2A and 3A. Example surface representations are discussed above at least in the context of: texture 112 of FIG. 1B, surfaces of planes 152a, 152b, 154a, 154a of FIG. 1B, surfaces of cubes 172a, 172b, 174a, 174b of FIG. 1C, texture 230 of FIG. 2A, surfaces of objects 310, 312, 320, 322, 330, and 350 of FIGS. 3A-3C, and texture 340 of FIG. 3C.

In some embodiments, the first object representation and the second object representation can both have a same size and a same shape, such as discussed above in the context of at least planes 152a, 152b, 154a, 154a of FIG. 1B, cubes 172a, 172b, 174a, 174b of FIG. 1C. In particular embodiments, the transformed first object representation can have a different shape from the transformed second object representation, such as indicated above by at least transformed objects 158a and 160a of FIG. 1B, and transformed objects 178a and 170a of FIG. 1C.

At block 520, the computing device can apply an object transformation to the first object representation to modify one or more geometric features of the first object representation based on one or more values of one or more characteristics of the first surface representation. Example object transformations are discussed above at least in the context of: block 120 of method 100 of FIG. 1A, transformed objects 158a, 158b, 160a, 160b of FIG. 1B, transformed objects 178a, 178b, 180a, 180b of FIG. 1C, transformation operator 224, texture 232, function 240, and transformed object 250 of FIG. 2A, aligned objects 320, 322 and merged object 330 of FIGS. 3B and 3C.

In some embodiments, applying the object transformation to the first object representation to modify one or more geometric features of the first object representation based on one or more values of one or more characteristics of the first surface representation can include: determining a point on a 2D surface of the first object representation; determining a normal of the first object representation at the point on the 2D surface; determining the one or more values of the one or more characteristics of the first surface representation for the point on the 2D surface; scaling the normal of the first object representation by the at least one value; and modifying one or more geometric features of the point on the 2D surface of the first object representation based on the scaled normal, such as discussed above in the context of at least: block 120 of method 100 of FIG. 1A, transformed objects 158a, 158b, 160a, 160b of FIG. 1B, transformed objects 178a, 178b, 180a, 180b of FIG. 1C, object 210, normal 222, transformation operator 224, texture 230, function 240, and transformed object 250 of FIG. 2A.

In particular of these embodiments, the one or more values of the one or more characteristics of the first surface representation for the point on the 2D surface can include a value related to one or more colors of the first surface representation for the point on the 2D surface, such as discussed above in the context of at least: block 120 of method 100 of FIG. 1A, transformed objects 158a, 158b, 160a, 160b of FIG. 1B, transformed objects 178a, 178b, 180a, 180b of FIG. 1C, object 210, normal 222, transformation operator 224, texture 230, function 240, and transformed object 250 of FIG. 2A.

In other particular of these embodiments, modifying the one or more geometric features of the point on the 2D surface of the first object representation based on the scaled normal can include translating the point on the 2D surface along the scaled normal, such as discussed above in the context of at least: block 120 of method 100 of FIG. 1A, transformed objects 158a, 158b, 160a, 160b of FIG. 1B, transformed objects 178a, 178b, 180a, 180b of FIG. 1C, object 210, normal 222, transformation operator 224, texture 230, function 240, and transformed object 250 of FIG. 2A.

At block 530, the computing device can apply the object transformation to the second object representation to modify one or more geometric features of the second object representation based on one or more values of one or more characteristics of the second surface representation. Example object transformations are listed above as part of the discussion of block 520.

At block 540, the computing device can align the first object representation and the second object representation using an alignment of the transformed first object representation and the transformed second object representation. Example alignments of transformed object representations are discussed above at least in the context of: block 130 of method 100 of FIG. 1A, aligned transformed objects 158b, 160b of FIG. 1B, aligned transformed objects 178b, 180b of FIG. 1C, aligned objects 320, 322 and merged object 330 of FIGS. 3B and 3C. Example alignments of object representations are discussed above at least in the context of: block 140 of method 100 of FIG. 1A, aligned planes 152b, 154b of FIG. 1B, aligned cubes 172b, 174b of FIG. 1C, aligned objects 320, 322 and merged object 330 of FIGS. 3B and 3C.

In some embodiments, the alignment of the transformed first object representation and the transformed second object representation can align the first surface representation and the second surface representation so to display at least a portion of an entire image on respective surfaces of the aligned first and second object representations, such as discussed above in the context of at least: block 140 of method 100 of FIG. 1A, aligned planes 152b, 154b of FIG. 1B, aligned cubes 172b, 174b of FIG. 1C, aligned objects 320, 322, merged object 330, and texture-applied merged object 350 of FIGS. 3B and 3C.

In particular embodiments, the entire image can be configured to be displayed on respective surfaces of an aligned plurality of object representations that can include the aligned first and second object representations, such as discussed above in the context of at least: block 140 of method 100 of FIG. 1A, aligned planes 152b, 154b of FIG. 1B, aligned cubes 172b, 174b of FIG. 1C, aligned objects 320, 322, merged object 330, and texture-applied merged object 350 of FIGS. 3B and 3C.

In other particular embodiments, the first surface representation can include a first portion of the entire image, the second surface representation can include a second portion of the entire image, and the first surface representation can differ from the second surface representation, such as discussed above in the context of at least: block 140 of method 100 of FIG. 1A, aligned planes 152b, 154b of FIG. 1B, aligned cubes 172b, 174b of FIG. 1C, aligned objects 320, 322, merged object 330, and texture-applied merged object 350 of FIGS. 3B and 3C. In more particular embodiments, the first surface representation and the second surface representation can include overlapping portions of the entire image, such as discussed above at least in the context of example 150 of FIG. 1B and example 170 of FIG. 1C.

At block 550, the computing device can provide an output based on the alignment of the first object representation and the second object representation. Example outputs that are based on aligned object representations are discussed above at least in the context of: block 140 of method 100 of FIG. 1A, aligned planes 152b, 154b of FIG. 1B, aligned cubes 172b, 174b of FIG. 1C, merged object 330 and texture-applied merged object 350 of FIG. 3C.

The above detailed description describes various features and functions of the disclosed systems, devices, and methods with reference to the accompanying figures, which form a part hereof. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication can represent a processing of information and/or a transmission of information in accordance with example embodiments. Alternative embodiments are included within the scope of these example embodiments. In these alternative embodiments, for example, functions described as blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A block that represents a processing of information can correspond to circuitry that can be configured to perform the specific logical functions of a herein-described method or technique. Alternatively or additionally, a block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk or hard drive or other storage medium.

The computer readable medium can also include non-transitory computer readable media such as non-transitory computer-readable media that stores data for short periods of time like register memory, processor cache, and random access memory (RAM). The computer readable media can also include non-transitory computer readable media that stores program code and/or data for longer periods of time, such as secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a block that represents one or more information transmissions can correspond to information transmissions between software and/or hardware modules in the same physical device. However, other information transmissions can be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A method, comprising:
    receiving, at a computing device, at least a first object representation and a second object representation, wherein the first object representation is associated with a first surface representation, and wherein the second object representation is associated with a second surface representation;
    applying an object transformation to the first object representation to modify one or more geometric features of the first object representation based on one or more values of one or more characteristics of the first surface representation using the computing device;
    applying the object transformation to the second object representation to modify one or more geometric features of the second object representation based on one or more values of one or more characteristics of the second surface representation using the computing device;
    aligning the first object representation and the second object representation using an alignment of the transformed first object representation and the transformed second object representation by the computing device; and
    providing an output of the computing device based on the aligned first object representation and second object representation.

2. The method of claim 1, wherein applying the object transformation to the first object representation to modify one or more geometric features of the first object representation based on one or more values of one or more characteristics of the first surface representation comprises:
    determining a point on a two-dimensional (2D) surface of the first object representation;
    determining a normal of the first object representation at the point on the 2D surface;
    determining the one or more values of the one or more characteristics of the first surface representation for the point on the 2D surface;
    scaling the normal of the first object representation by the one or more values; and
    modifying one or more geometric features of the point on the 2D surface of the first object representation based on the scaled normal.

3. The method of claim 2, wherein the one or more values of the one or more characteristics of the first surface representation for the point on the 2D surface comprises a value related to one or more colors of the first surface representation for the point on the 2D surface.

4. The method of claim 2, wherein modifying the one or more geometric features of the point on the 2D surface of the first object representation based on the scaled normal comprises translating the point on the 2D surface along the scaled normal.

5. The method of claim 1, wherein the first object representation and the second object representation both have a same size and a same shape, and wherein the transformed first object representation has a different shape from the transformed second object representation.

6. The method of claim 1, wherein the alignment of the transformed first object representation and the transformed second object representation aligns the first surface representation and the second surface representation so to display at least a portion of an entire image on respective surfaces of the aligned first and second object representations.

7. The method of claim 6, wherein the entire image is configured to be displayed on respective surfaces of an aligned plurality of object representations that comprises the aligned first and second object representations.

8. The method of claim 6, wherein the first surface representation comprises a first portion of the entire image, wherein the second surface representation comprises a second portion of the entire image, and wherein the first surface representation differs from the second surface representation.

9. The method of claim 8, wherein the first surface representation and the second surface representation comprise overlapping portions of the entire image.

10. A computing device, comprising:
    at least one processor; and
    data storage including program instructions stored thereon that when executed by the at least one processor, cause the computing device to perform functions comprising:
        receiving at least a first object representation and a second object representation, wherein the first object representation is associated with a first surface representation, and wherein the second object representation is associated with a second surface representation;
        applying an object transformation to the first object representation to modify one or more geometric features of the first object representation based on one or more values of one or more characteristics of the first surface representation;
        applying the object transformation to the second object representation to modify one or more geometric features of the second object representation based on one or more values of one or more characteristics of the second surface representation;
        aligning the first object representation and the second object representation using an alignment of the transformed first object representation and the transformed second object representation; and
        providing an output based on the aligned first object representation and second object representation.

11. The computing device of claim 10, wherein applying the object transformation to the first object representation to modify one or more geometric features of the first object representation based on one or more values of one or more characteristics of the first surface representation comprises:
    determining a point on a two-dimensional (2D) surface of the first object representation;
    determining a normal of the first object representation at the point on the 2D surface;
    determining the one or more values of the one or more characteristics of the first surface representation for the point on the 2D surface;
    scaling the normal of the first object representation by the one or more values; and
    modifying one or more geometric features of the point on the 2D surface of the first object representation based on the scaled normal.

12. The computing device of claim 11, wherein the one or more values of the one or more characteristics of the first surface representation for the point on the 2D surface comprises a value related to one or more colors of the first surface representation for the point on the 2D surface.

13. The computing device of claim 11, wherein modifying the one or more geometric features of the point on the 2D surface of the first object representation based on the scaled normal comprises translating the point on the 2D surface along the scaled normal.

14. The computing device of claim 10, wherein the first object representation and the second object representation both have a same size and a same shape, and wherein the transformed first object representation has a different shape from the transformed second object representation.

15. The computing device of claim 10, wherein alignment of the transformed first object representation and the transformed second object representation aligns the first surface representation and the second surface representation so to display at least a portion of an entire image on respective surfaces of the aligned first and second object representations.

16. The computing device of claim 15, wherein the entire image is configured to be displayed on respective surfaces of an aligned plurality of object representations that comprises the aligned first and second object representations.

17. The computing device of claim 15, wherein the first surface representation comprises a first portion of the entire image, wherein the second surface representation comprises a second portion of the entire image, and wherein the first surface representation and the second surface representation comprise overlapping portions of the entire image.

18. A non-transitory computer readable medium having stored thereon instructions, that when executed by one or more processors of a computing device, cause the computing device to perform functions comprising:
receiving at least a first object representation and a second object representation, wherein the first object representation is associated with a first surface representation, and wherein the second object representation is associated with a second surface representation;
applying an object transformation to the first object representation to modify one or more geometric features of the first object representation based on one or more values of one or more characteristics of the first surface representation;
applying the object transformation to the second object representation to modify one or more geometric features of the second object representation based on one or more values of one or more characteristics of the second surface representation;
aligning the first object representation and the second object representation using an alignment of the transformed first object representation and the transformed second object representation; and
providing an output based on the aligned first object representation and second object representation.

19. The non-transitory computer readable medium of claim 18, wherein applying the object transformation to the first object representation to modify one or more geometric features of the first object representation based on one or more values of one or more characteristics of the first surface representation comprises:
determining a point on a two-dimensional (2D) surface of the first object representation;
determining a normal of the first object representation at the point on the 2D surface;
determining the one or more values of the one or more characteristics of the first surface representation for the point on the 2D surface;
scaling the normal of the first object representation by the one or more values; and
modifying one or more geometric features of the point on the 2D surface of the first object representation based on the scaled normal.

20. The non-transitory computer readable medium of claim 19, wherein the one or more values of the one or more characteristics of the first surface representation for the point on the 2D surface comprises a value related to one or more colors of the first surface representation for the point on the 2D surface.

* * * * *